(No Model.) 7 Sheets—Sheet 1.
J. B. HARDY.
MACHINE FOR THREADING AND POINTING SCREW EYES.

No. 368,394. Patented Aug. 16, 1887.

WITNESSES:
Otto Beyer
C. Sedgwick

INVENTOR:
J. B. Hardy
BY Munn & Co
ATTORNEYS.

(No Model.) 7 Sheets—Sheet 2.
J. B. HARDY.
MACHINE FOR THREADING AND POINTING SCREW EYES.
No. 368,394. Patented Aug. 16, 1887.

(No Model.) 7 Sheets—Sheet 3.

J. B. HARDY.
MACHINE FOR THREADING AND POINTING SCREW EYES.

No. 368,394. Patented Aug. 16, 1887.

WITNESSES:
Theo Beyer
C. Sedgwick

INVENTOR:
J. B. Hardy
BY Munn & Co
ATTORNEYS.

(No Model.) 7 Sheets—Sheet 4.
J. B. HARDY.
MACHINE FOR THREADING AND POINTING SCREW EYES.
No. 368,394. Patented Aug. 16, 1887.

WITNESSES:

INVENTOR:
J. B. Hardy
BY Munn & Co.
ATTORNEYS.

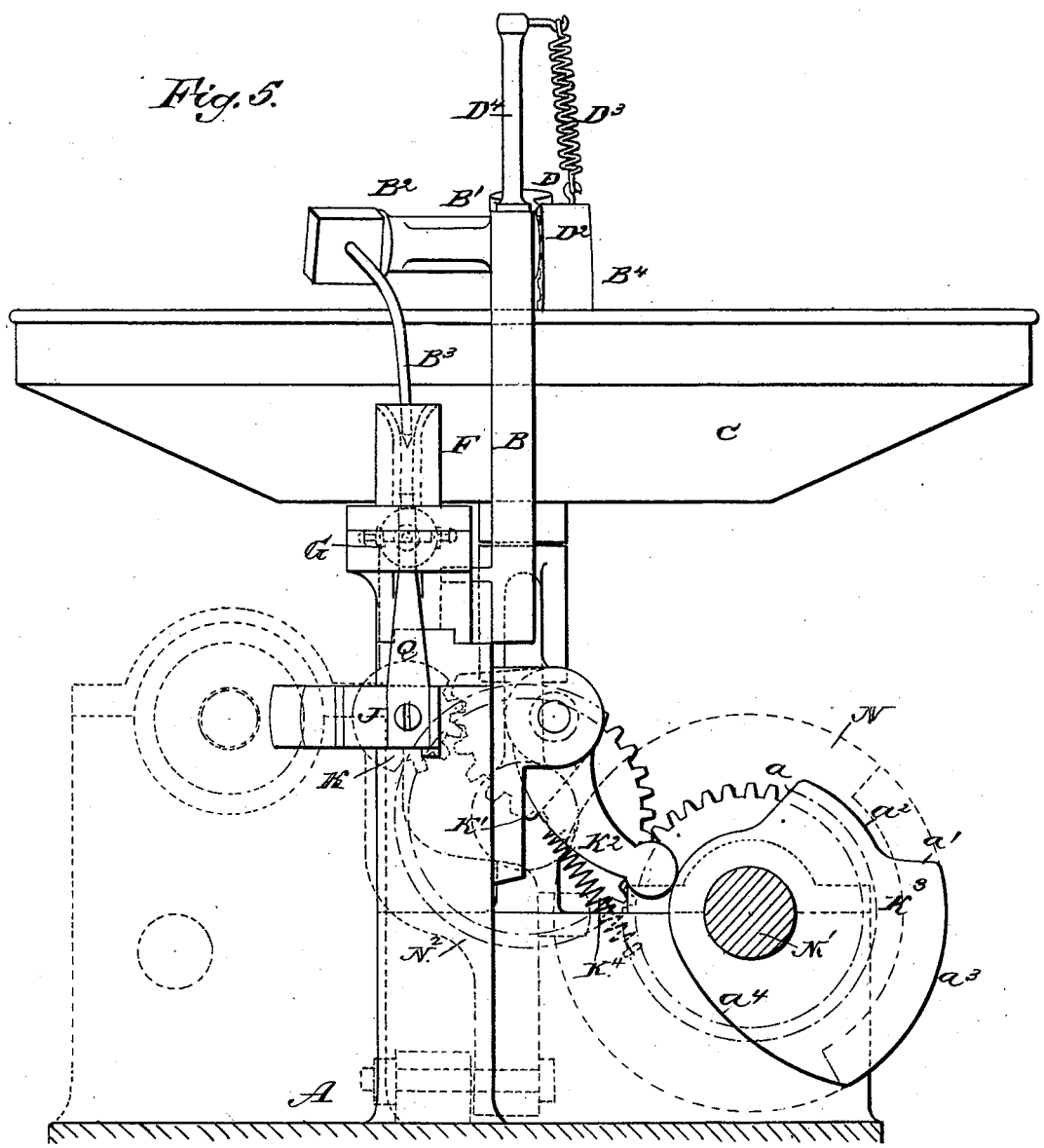

(No Model.) 7 Sheets—Sheet 6.
J. B. HARDY.
MACHINE FOR THREADING AND POINTING SCREW EYES.
No. 368,394. Patented Aug. 16, 1887.
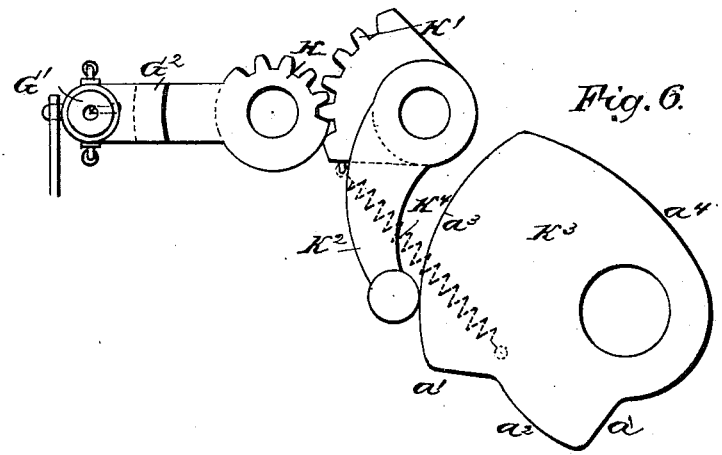
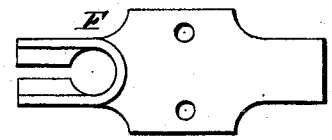
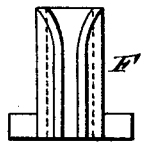 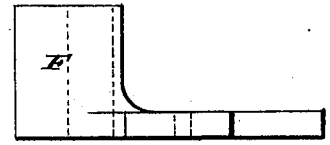
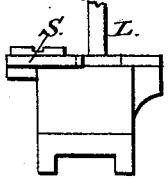 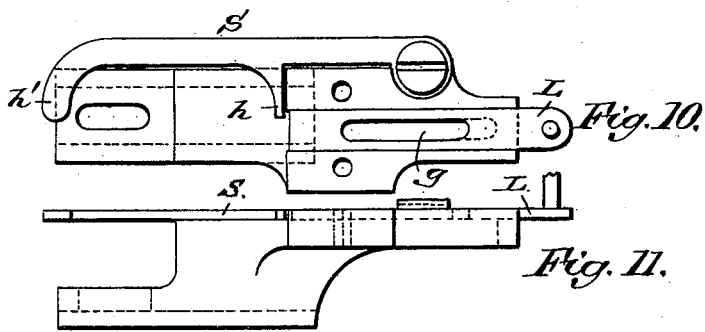
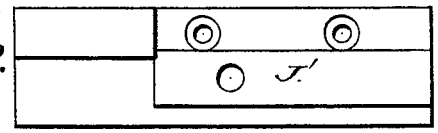 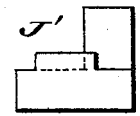
WITNESSES:
Otto Beyer
C. Sedgwick
INVENTOR:
J. B. Hardy
BY Munn & Co.
ATTORNEYS.

(No Model.) 7 Sheets—Sheet 7.
J. B. HARDY.
MACHINE FOR THREADING AND POINTING SCREW EYES.
No. 368,394. Patented Aug. 16, 1887.
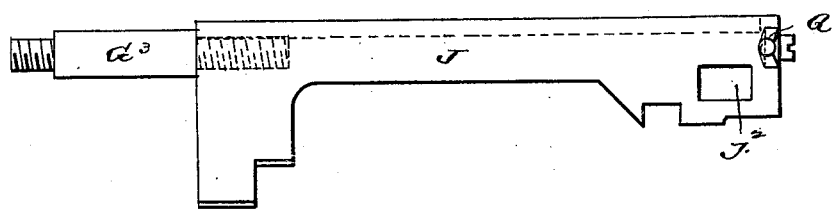
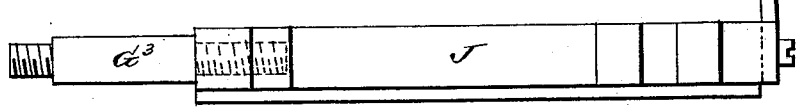
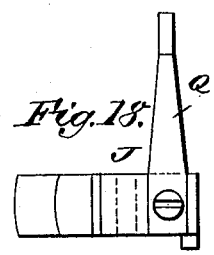
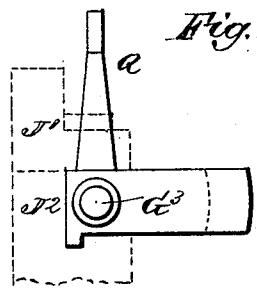
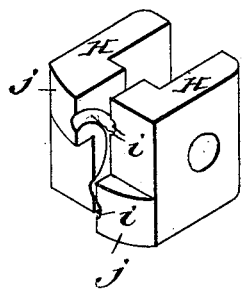
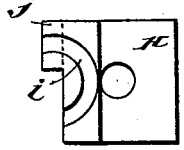
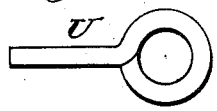
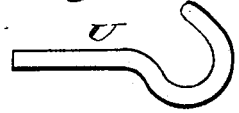
WITNESSES: INVENTOR:
Otto Beyer J. B. Hardy
C. Sedgwick BY Munn & Co
ATTORNEYS.

UNITED STATES PATENT OFFICE.

JOHN B. HARDY, OF BROOKLYN, NEW YORK.

MACHINE FOR THREADING AND POINTING SCREW-EYES.

SPECIFICATION forming part of Letters Patent No. 368,394, dated August 16, 1887.

Application filed December 17, 1886. Serial No. 221,851. (No model.)

*To all whom it may concern:*

Be it known that I, JOHN B. HARDY, of Brooklyn, in the county of Kings and State of New York, have invented a new and Improved Screw-Machine, of which the following is a full, clear, and exact description.

My invention relates to certain improvements applied to the so-called "Cook" screw-machine, and is designed more particularly for adapting said machine for threading screw eyes or hooks of the character shown in Figures 22 and 23 of the drawings hereto attached.

The invention consists of the feed mechanism for feeding the blanks from the revolving hopper to an auxiliary hopper; of the means for feeding the blanks to the pointer; of means for swinging the pointer and pointer-spindle laterally to align them with the jaws for revolving the blanks to point the same and cut the thread; and the invention finally consists of means for giving the pointer and pointer-spindle a longitudinal movement for entering the blank between the revolving jaws, and also for operating the feed-plate at the bottom of the auxiliary hopper.

The invention also consists of the construction, arrangement, and combination of parts, all as hereinafter described and claimed.

Reference is to be had to the accompanying drawings, forming a part of this specification, in which similar letters of reference indicate corresponding parts in all the figures.

Figure 1:
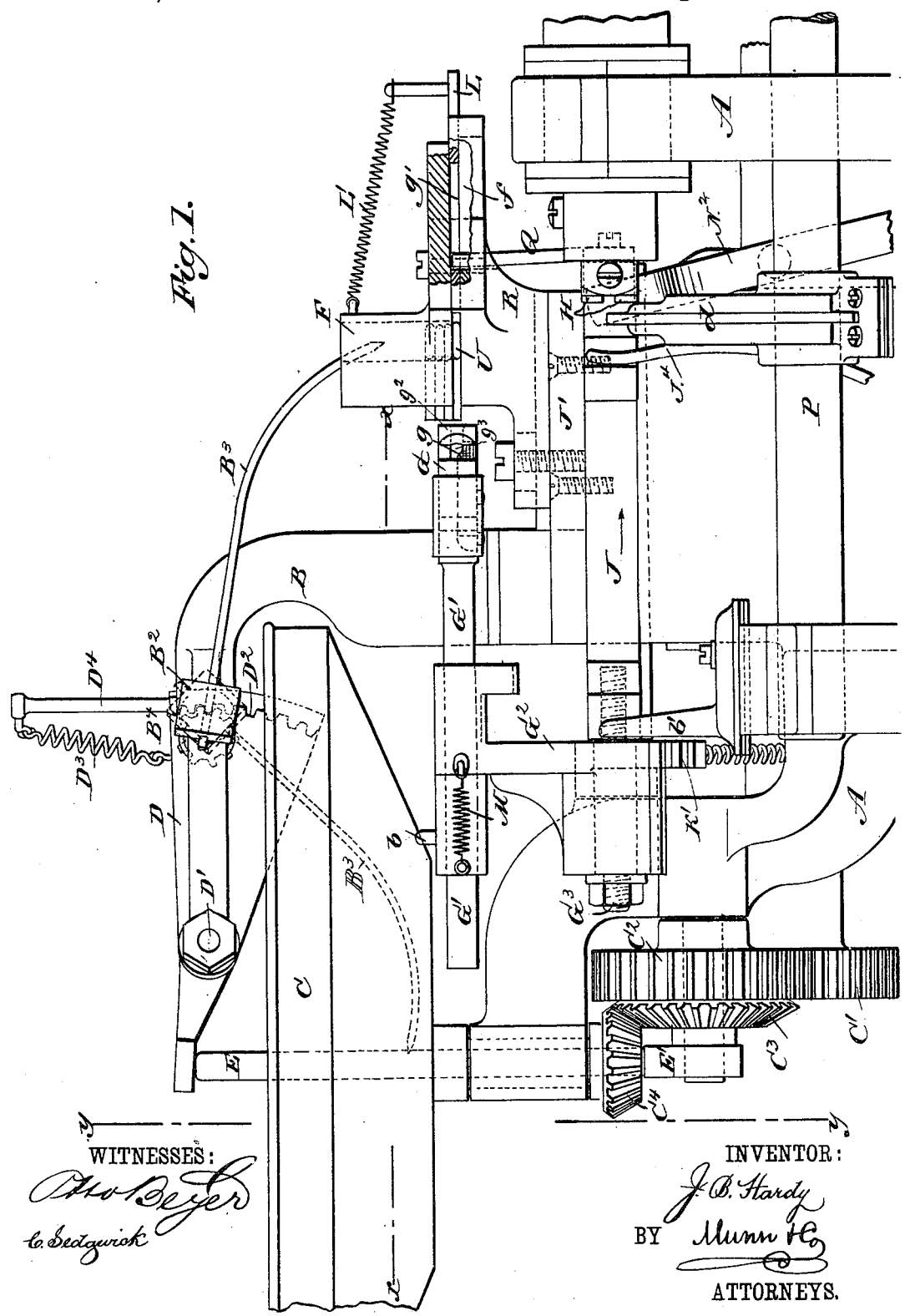
Figure 2:
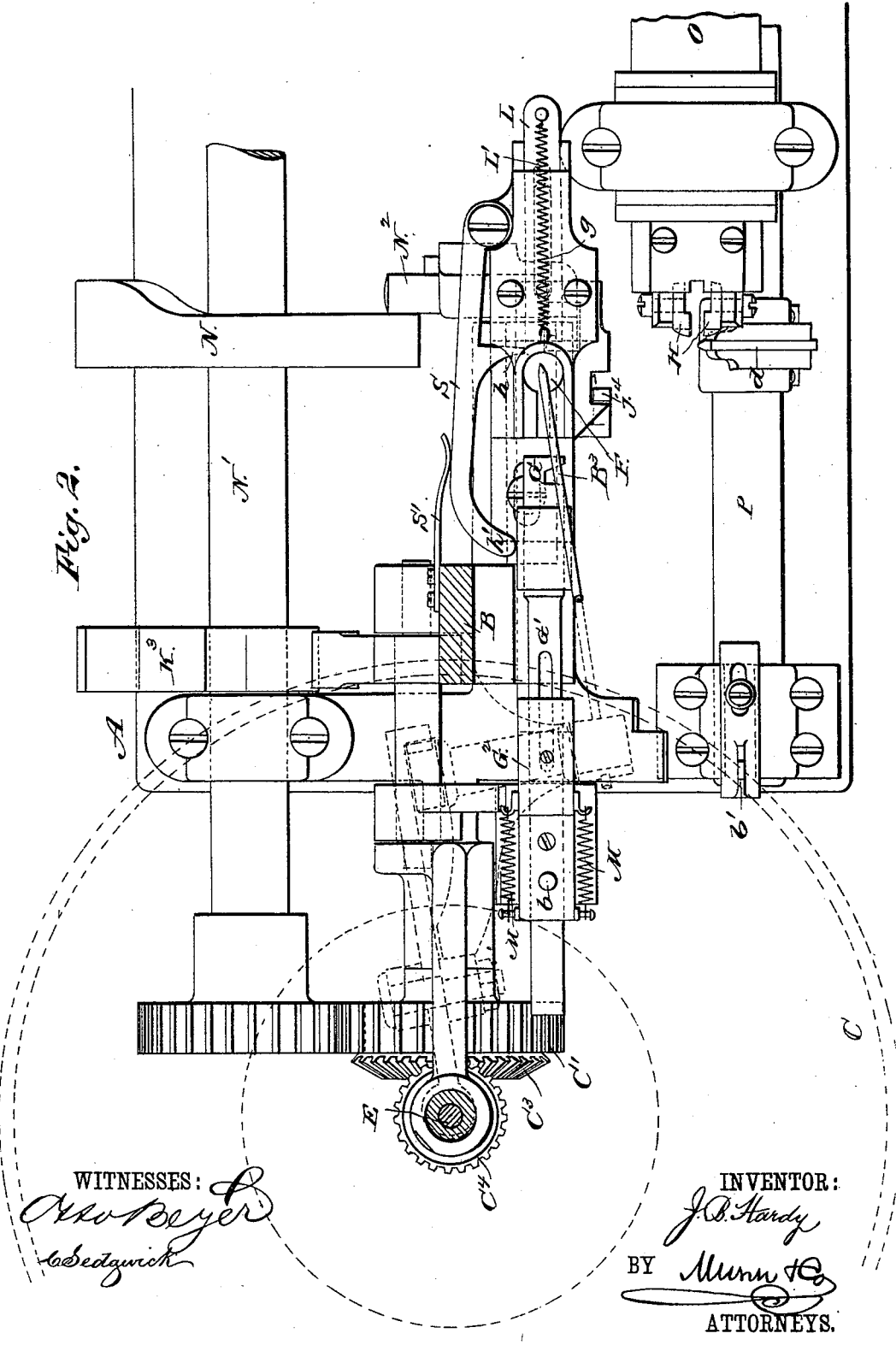
Figure 3:
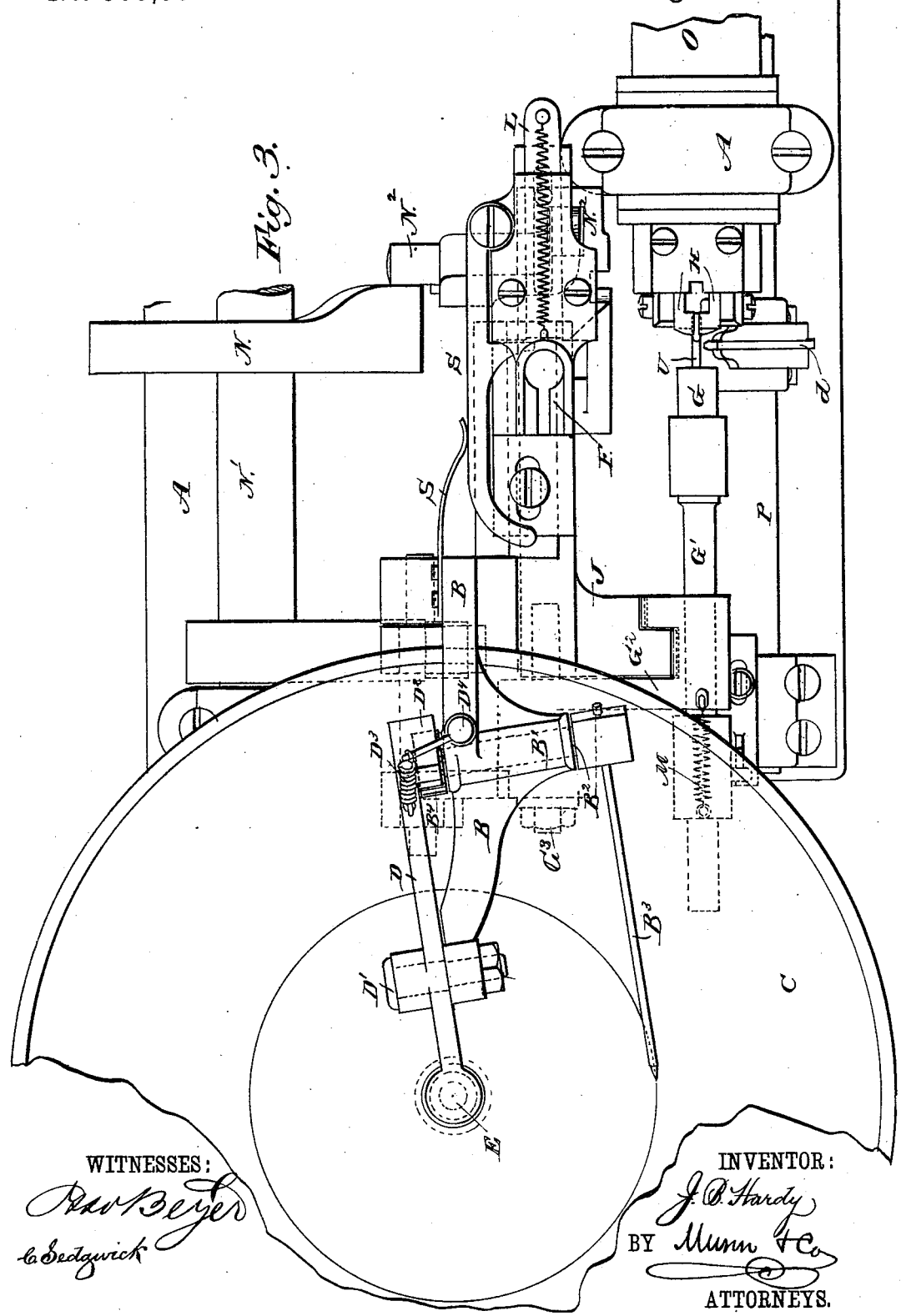
Figure 4:
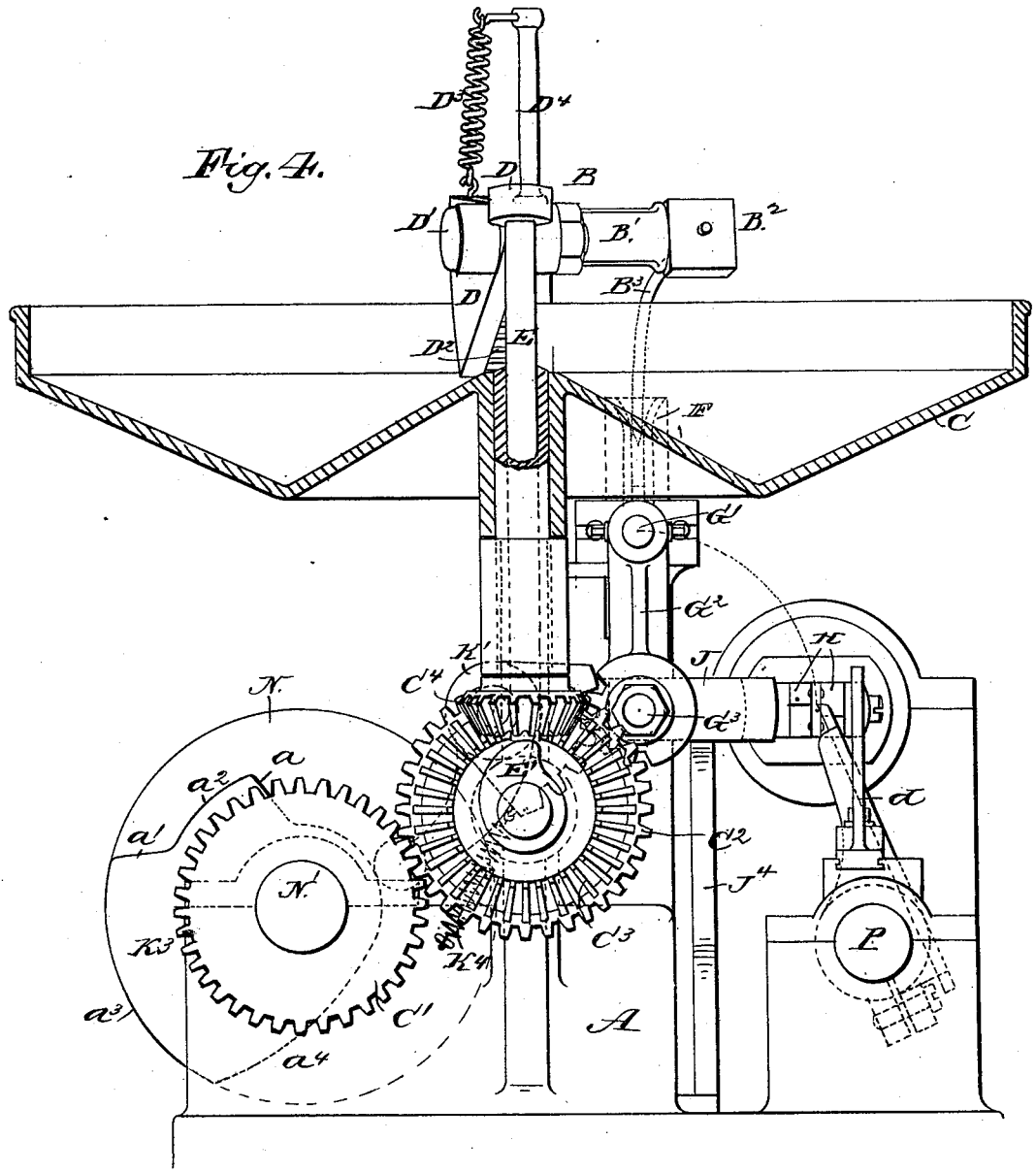

Figure 1 is a side elevation of a portion of an ordinary Cook screw-machine having my improvements applied thereto, a portion of the auxiliary hopper frame and plate being broken away to show the construction of the feed-plate for forcing the blanks into the pointer, the latter and the spindle to which it is attached being shown in position to receive a blank. Fig. 2 is a sectional plan view of the same, taken on the line $x\ x$ of Fig. 1. Fig. 3 is a plan view of a part of a machine, showing the parts in the position they assume when the pointer is swung to one side and the blank thrust between the jaws for turning it. Fig. 4 is a sectional elevation taken on the line $y\ y$ of Fig. 1. Fig. 5 is a detail transverse sectional view showing particularly the location of the means for swinging the pointer laterally. Fig. 6 is a detail view of said mechanism separate from the machines. Figs. 7, 8, and 9 are respectively plan, side, and front views of the auxiliary hopper. Figs. 10, 11, and 12 are respectively plan, side, and front views of the means for feeding the blanks one by one from the auxiliary hopper to the pointer. Figs. 13, 14, and 15 are respectively plan, side, and end views of a pillow-block applied to the main frame of the ordinary machine for supporting the auxiliary hopper and feed mechanism for feeding the blanks to the pointer. Figs. 16, 17, and 18 are plan, side, and end views of the sliding bar to which the pointer is attached. Fig. 19 shows in full lines an end view of said bar and the cam and lever for moving said bar longitudinally, and showing in dotted lines a part of the main frame and the pillow-block shown in Figs. 13, 14, and 15. Fig. 20 is a perspective view of the jaws for turning the blank. Fig. 21 is a face view of one of said jaws; and Figs. 22 and 23 show two forms of blanks, one with an eye, the other with a hook.

The ordinary frame, A, of the machine is provided with the angle-arm B, the upper horizontal portion of which overhangs the hopper C, to which the blanks U, to be pointed and threaded, are supplied in quantities. The said hopper C is given a slow rotary movement by the gear-wheels C', C², C³, and C⁴ in the usual manner. At the upper horizontal portion of the angle-arm B is journaled, in a sleeve, B', the short horizontal shaft B², to one end of which is attached the feed-hook B³, while to the other end is secured the pinion B⁴. At the upper extremity of the arm B, which reaches nearly to the center of the main hopper C, is fulcrumed, on the pin D', the arm D. One end of this arm is formed with the sector-rack D², which engages with the pinion B⁴. This end of the arm D is normally held elevated by the coiled spring D³, attached at one end to the arm and at the other to the upper end of the post D⁴, rising from the angle-arm B. The opposite end of the arm D rests upon the upper end of the rod E, which reaches down through the hopper C and gear-wheel C⁴, and is vertically reciprocated by the cam E' in the usual manner. The upward movement of the rod E elevates the adjacent end of the arm D and depresses the sector D², which turns the pinion B⁴ and horizontal shaft B², and swings the feed-hook B³ from the position shown in dotted lines in Fig.

1 to that shown in full lines in said figure. The downward movement of the rod E permits the spring D³ to elevate the sector end of the arm D, which will reverse the revolution of the pinion B⁴ and the shaft B², and carry the feed-hook B³ back into the hopper C. This movement of the hook B³, together with the constant rotation of the hopper C, will feed the blanks from the main hopper C to the auxiliary hopper F, from which they are fed one by one into the pointer G, as hereinafter described.

The pointer G is provided with a knife, g, of the usual form, to point the blanks when revolved by the jaws H, and the pointer is secured to the end of the pointer-spindle G', held in the arm G², pivoted upon the stud G³, screwed into the end of the block J. The arm G² is adapted to turn upon the stud G³ for carrying the pointer-spindle G' from a position in front of the jaws H—that is, from the position shown in Fig. 3 to that shown in Fig. 1. For this purpose I form the arm G² with the segmental rack K, which is engaged by the segmental rack K', which latter is formed with the arm K², which is acted upon by the cam K³, which serves to swing the arm G² and the pointer-spindle G' in front of the jaws H, as shown in Fig. 3. When the cam K³ passes the arm K², the coiled spring K⁴, attached to the segmental rack K' and to a fixed part of the main frame, acts through the segmental racks to return the pointer-spindle and pointer to position in front of the auxiliary hopper F to receive another blank. The spring K⁴ also causes the arm K² to hug the cam K³, which is formed with the two shoulders a a', the intermediate concentric, a², outer concentric, a³, and return stop a⁴, which give the pointer-spindle first a slight side movement, then a dwell, then another side movement, then another dwell, and then permit its gradual return to the starting-point.

While the pointer-spindle G' remains in front of the auxiliary hopper F, a blank is forced into the pointer G by the feeding-plate L, which slides in the bottom of the said hopper and is thrust forward at the proper time by the spring L', as described below. The pointer-spindle is held to this thrust of the feed-spring L' and plate L by the two springs M. During the dwell caused by the concentric a² of cam K³ the bar J, arm G², attached to the end thereof, and the pointer-spindle are carried in the direction of the arrow, Fig. 1, by a cam, N, Figs. 2 and 3, which is secured upon the shaft N', and acts through the lever N², (see Figs. 1, 2, and 5,) fulcrumed on the frame and connected to the bar J, by its upper end entering the mortise j² of the bar J. (See Fig. 16.) The bar J is returned by the plate-spring J⁴. This longitudinal movement of the bar J is permitted by the long bearing J' J², by which it is secured to the main frame of the machine, and this movement is limited by the stop b, Figs. 1 and 2, on the pointer-spindle and the stop b' on the main frame, which stops are arranged to bring the eye of the blank held by the pointer G just in line with the jaws H. The next side movement of the pointer-spindle, caused by the shoulder a' of the cam K³, carries the eye of the blank between the jaws H, which are revolved by the shaft O in the ordinary manner, and which revolve the blank. When the eye of the blank is entered between the jaws H, the shank of the blank rests in contact with the threader d on shaft P, which is given a longitudinal and slight rotary movement in the ordinary manner, so that the revolution of the blank not only points but threads it, forming a sharp "gimlet" point.

The bar J is provided with the upwardly-projecting arm Q, which works in a slot, f, in the auxiliary hopper-frame R, and also in a slot, g', in the feed-plate L, as shown in Fig. 1, so that the forward movement of the bar J will move the feed-plate L longitudinally against the tension of the spring L'. This longitudinal movement of the plate L continues until the inner end of the plate passes the hook or point h of the pivoted arm S, which is acted upon by the spring S', so that the point h will lock the plate L against the strain of the spring L' at the time the pointer-spindle G' is swung to one side. When the pointer-spindle is swung back in line with the auxiliary hopper F and feed-plate L, the spindle will strike the curved end h' of the arm S, and swing it outward and release the feed-plate L, which will be suddenly drawn forward by the spring L', and will thrust a blank from the auxiliary hopper F into the pointer G.

The jaws H are formed at their adjacent faces with curved grooves i, to receive the eye or hook of the blanks, and at opposite corners of the jaws are formed the projections j, as shown in Figs. 20 and 21, to brace and support the eye and shank of the blanks, and the projection j on jaws H also assist the eye of the blank to enter between the jaws. The pointer G is extended beyond the knife g to form a sleeve, g², a slot, g³, being formed to expose the knife and to permit the escape of the cuttings. The sleeve g² is for firmly holding the blanks while being carried from hopper F to the jaws H.

Having thus described my invention, what I claim as new, and desire to secure by Letters Patent, is—

1. In a machine for threading and pointing screw-eyes, the combination, with a hopper, C, of the feed-hook B³, attached to a rotary reciprocating shaft arranged above the hopper, substantially as described.

2. The hopper C, vertically-reciprocating rod E, and shaft B², held over the hopper and provided at one end with the feed-hook B³, and at the other with a pinion, in combination with the lever D, provided with rack D², arranged substantially as and for the purposes set forth.

3. In a machine for threading and pointing screw-eyes, the auxiliary hopper F, provided with a sliding feed-plate, L, for forcing the blanks into the pointer, substantially as described.

4. In a machine for threading and pointing screw-eyes, the pointer-spindle G', its pointing-knife g, and its carrying-arm, the latter pivoted upon a stud, in combination with means, substantially as described, for swinging the spindle laterally, as and for the purposes set forth.

5. In a machine for threading and pointing screw-eyes, the pointer-spindle G', its knife g, held at one end of the spindle, the arm G², in which the spindle is held, placed loosely upon the horizontal stud G³, on which the arm G² is pivoted, and the movable bar J, to which the stud G³ is attached, in combination with means for swinging the arm and pointer-spindle laterally upon the stud, and means for moving the bar J, stud, arm, and spindle longitudinally, substantially as described.

6. The auxiliary hopper F and sliding feeder L, in combination with the bar J, means for moving it longitudinally, and the arm Q, attached to the bar and to the feed-plate L, substantially as described.

7. In a machine for threading and pointing screw-eyes, the auxiliary hopper F, feed-plate L, and revolving jaws H, arranged at one side of the hopper, in combination with the pointer-spindle G' and means for swinging the spindle laterally and means for moving it longitudinally, substantially as described.

8. The combination, with the auxiliary hopper and feed-plate therein, of the stop-arm S for locking the feed-plate, substantially as described.

9. The auxiliary hopper F, feed-plate L, and spring-actuated stop-arm S, in combination with the pointer-spindle G' and means for moving it laterally and longitudinally, substantially as described.

10. The jaws H, formed at their adjacent faces with the grooves i and at their outer edges with the lugs j, substantially as and for the purposes described.

11. In a screw-machine, the combination, with a revoluble hopper and an auxiliary hopper, of a curved, pointed, vibrating or reciprocating arm, substantially as set forth.

12. In a machine for threading and pointing screw-eyes, the combination, with an auxiliary hopper provided with means for feeding the blanks one by one from said hopper, and revoluble jaws, of a sliding bar, J, a pointer-carrying arm pivoted to said bar, a cam acting on said arm, and mechanism for reciprocating said block, substantially as set forth.

13. In a machine for threading and pointing screw-eyes, the combination, with an auxiliary hopper, a sliding bar, J, and a pointer-carrying arm pivoted on said bar J, means for swinging said arm, and means for reciprocating said bar J, of a slide in the bottom of said hopper, a projection on the sliding bar J, engaging a slot in the slide, a retaining-lever for the slide, and a spring on the slide, substantially as set forth.

14. The spindle G', provided at one end with the pointer G, formed with the sleeve g² in front of the knife g, in combination with the hopper F and its feed-plate for thrusting the blanks through the sleeve g² into contact with the cutting-edge of the knife g, substantially as described.

JOHN B. HARDY.

Witnesses:
JAS. S. HALL,
ELIZA ANN HALL.